ANALOG TO DIGITAL ENCODER

Original Filed Sept. 21, 1964 3 Sheets-Sheet 2

INVENTOR.
EDWIN L. WHEELER
BY
Christie, Parker & Hale
ATTORNEYS.

Dec. 30, 1969 E. L. WHEELER 3,487,460

ANALOG TO DIGITAL ENCODER

Original Filed Sept. 21, 1964 3 Sheets-Sheet 3

INVENTOR.
EDWIN L. WHEELER
BY
Christie, Parker & Hale
ATTORNEYS.

United States Patent Office 3,487,460
Patented Dec. 30, 1969

3,487,460
ANALOG TO DIGITAL ENCODER

Edwin L. Wheeler, Glendora, Calif., assignor to Conrac Corporation, New York, N.Y., a corporation of New York Continuation of application Ser. No. 397,812, Sept. 21, 1964. This application Apr. 5, 1968, Ser. No. 719,026
Int. Cl. H03k *13/00;* H041 *3/00*
U.S. Cl. 340—347 17 Claims

ABSTRACT OF THE DISCLOSURE

An analog to digital encoder having an encoding element provided with a pattern of unit distance binary characters recorded in tracks thereon and including a pattern of unit distance characters arranged in an advance-retard relationship with at least one of the tracks. The encoding element being characterized as having a pair of selector segments defined relative to the sensing elements for the encoder to be complementary except for an extent substantially less than a unit distance over which both are active for selecting either the advanced or retarded tracks when activated.

This application is a continuation of my earlier filed, copending application bearing Ser. No. 397,812 and filed on Sept. 21, 1964, and assigned to the same assignee as the present application; now abandoned.

This invention relates to an analog to digital converter and, more particularly, to a shaft position encoder utilizing an improved encoding pattern.

It is well known that the positions of a rotating shaft may be encoded by assigning each shaft position a decimal number and coding the positions by means of binary numbers to represent a complete revolution of the shaft. A principal problem with respect to these analog to digital converters or encoders is the provision of a distinct set of binary signals for each change in analog signal or shaft position without any ambiguities. The ambiguities in digitizing a shaft position are introduced into the converting system or encoder when adjacent binary numbers differ by more than one binary bit or character and these binary numbers are not simultaneously changed in response to the changes of shaft position. These ambiguity problems arise from practical considerations with regard to the alignment tolerances of the encoding and sensing elements. Two general methods for solving these ambiguity problems have been developed and are discussed in the text entitled "Notes on Analog-Digital Conversion Techniques" edited by Alfred N. Susskind and published jointly by the Technology Press of Massachusetts Institute of Technology and John Wiley and Sons Inc. of New York, in 1957, on pages 6–40 through 6–70.

One of the methods for solving the ambiguity problem is to employ a unit distance code such as the Datex or Gray code wherein only one binary character or binary bit changes in traversing adjacent numbers. The other method is to utilize a pair of sensing elements for each of the higher order tracks or alternatively to utilize a single sensing element for each of the higher order tracks and to duplicate the encoding patterns for these tracks in a lead-lag or advance-retard relationship and use them in combination with logical selection circuitry. The logical selection circuitry is responsive to a sensing element for a lower order track to select either one of the sensing elements or one of the patterns for the higher order tracks, as the case may be, and thereby cause the simultaneous switching of all the sensing elements. These techniques have been employed for both single turn and multi-turn encoders. Of these two methods, only the logical switching technique affords a solution to the ambiguity problem between discs in multi-turn encoders.

Whether a single turn or a multi-turn encoder is considered, when the logical switching technique is employed, it has been considered necessary heretofore to utilize an electrical or mechanical device to perform the selection of the leading or lagging sensing elements or tracks because it has been considered necessary heretofore to provide true complements. In considering a shaft position encoder wherein the encoding element has the binary pattern recorded thereon in terms of conductive and nonconductive segments, one of the tracks, usually the track adjacent the outer periphery of the encoding element, represents the least significant binary character and presents a cyclic pattern of on and off contacts. This track of the encoding element has been commonly termed the selector track. This sequence of on and off contacts provided by the selector track has been combined with at least a single active circuit element that is responsive to the sensing of the conductive and nonconductive segments to provide the necessary true complementary selection signals from the active circuit element for selecting either one of the sensing elements for the higher order tracks or one of the leading or lagging order patterns for the higher order tracks or on the low speed discs. An example of this type of selector track operation is illustrated in Patent 3,054,996. These active selection devices have taken the form of relays, vacuum tubes, transistors, mechanical toggles or other types of switches. Each of these devices, of course, require a certain amount of power, space, mounting hardware, etc., in addition to a finite switching time.

The present invention provides an improved analog to a digital converter or shaft position encoder wherein the usual selection circuits whether for single turn or multi-turn operation or whether internally or externally located have been entirely eliminated. These selection circuits require energy while the selection opration is effected by the encoder of the present invention without requiring any energy other than the rotation of the encoder input shaft. The encoder of the present invention further eliminates the requirement for any electrical or mechanical device to perform selection other than the combination of the sensing and encoding elements. The improved shaft position encoder of this invention affords instantaneous parallel read out of the entire circuitry and by eliminating the active selection devices of the prior art eliminates the need for programming of the selector circuit in a data recording system.

The use of active circuit elements in combination with a selector track in an encoding unit employing a unit distance code has been considered necessary heretofore since it is known that two selector tracks cannot be produced that are exactly complementary and exact or true complements have been obtained from these active circuit elements. If two selector tracks are resorted to, they must be defined to be either "make before break" or "break before make." "Break before make" is of no practical use, since both selectors would be non-conducting at the transition points and produce all binary zeroes as an output count from the encoder. With a "make before break" arrangement of the selector tracks, at the transition points both the advance and retard brushes will be energized. Due to the fact that a unit distance code is employed only one binary bit is undergoing change at the transition, permits both the advance and retard common brushes to be energized at the same time. Since the two counts only differ by the one bit, the count produced from the encoder is correct except for that one bit. As a practical matter, the fact that the one bit is "made" for a slightly longer time interval than would be the case with the use of an active circuit element merely results in displacing the transition point but does not result in the production of encoding errors, erroneous counts.

Broadly, the concept of the present invention is applicable to both single turn and multi-turn encoding devices based on a unit distance code and comprises recording on one of the encoding elements a pair of selector tracks which are defined to be complementary except for a portion less than a unit distance or one quantum. As specifically applied to an encoding disc having the unit distance code recorded in terms of conductive and nonconductive segments the overlap of the two selector tracks is defined as an angle less than a unit distance or one quantum in extent over which both are conducting, make before break, and during which interval none of the low order bits are changing.

In a practical encoder construction, the amount of overlap will depend on the type of application and the amount of error that is permissible and may range from no overlap to three-fourths of a count. An increased amount of overlap, of course, reduces the manufacturing tolerances and the amount of overlap is a choice between manufacturing costs and minimizing the error for any particular application. To minimize the errors and increase the manufacturing tolerances, for example, when a contact type of encoder is desired wherein the encoding pattern is recorded on a disc, the pair of selector tracks required by the present invention may be recorded adjacent the outer periphery of the encoding disc. In a multi-turn encoder, one of the selector tracks, for example, can be utilized for selecting the higher order bits arranged in an advance relationship on the low speed disc, while the other selector track can be utilized for selecting the corresponding lagging or retard higher order bits on the low speed disc.

The concept of the present invention can also be employed to avoid the very close tolerances required by the tracks recorded adjacent the axis of rotation of an encoding disc in relation to the tolerances of the tracks recorded adjacent the outer radii of the disc.

These and other features of the present invention may be more fully appreciated when considered in the light of the following specification and drawings, in which.

Figure 6:
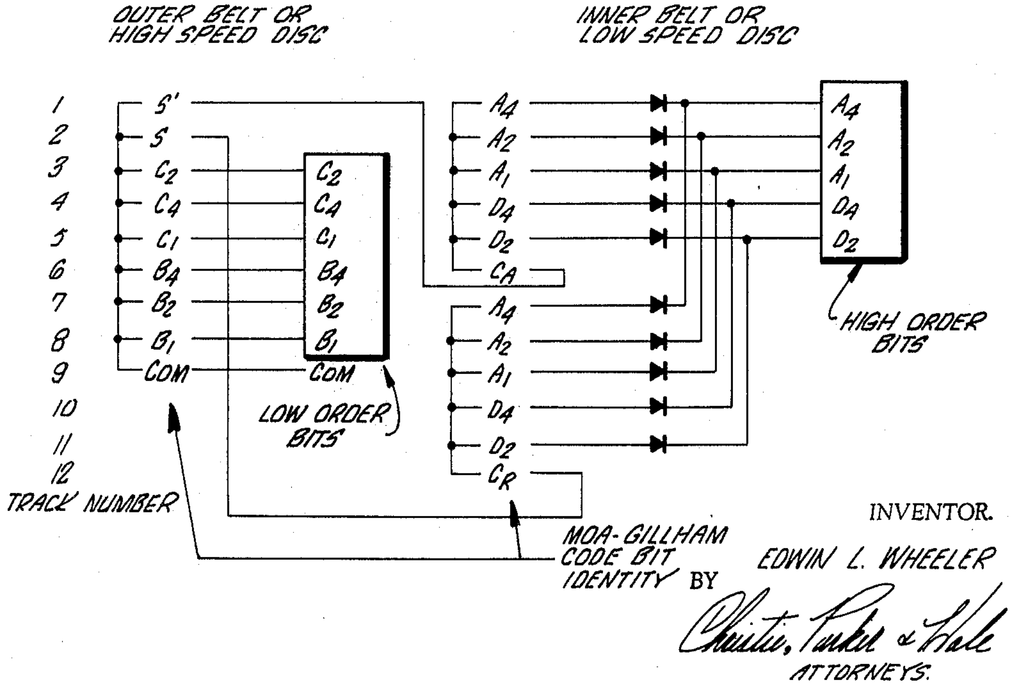
Figure 5:
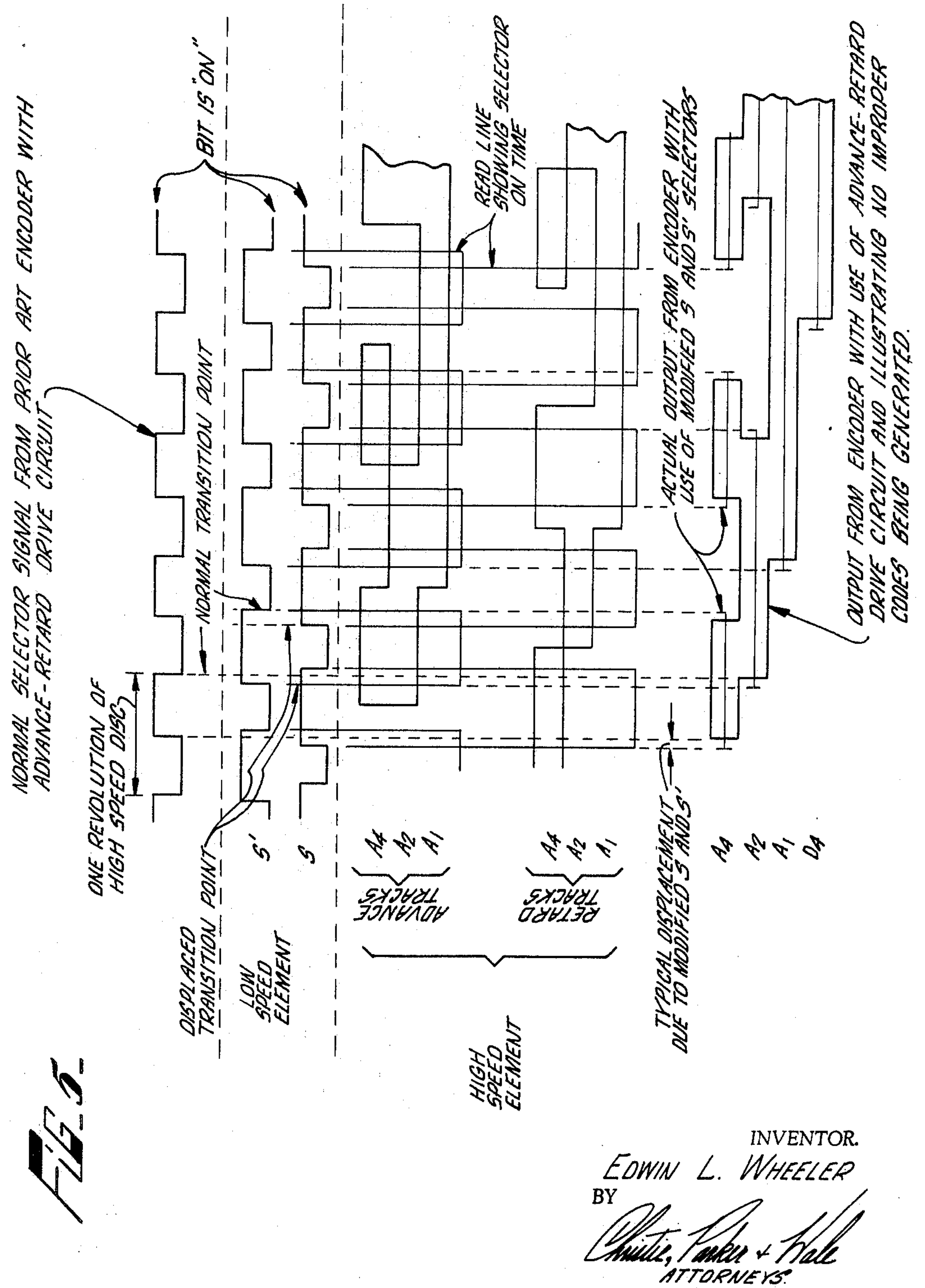

FIG. 5 is a developed, fragmentary view of the patterns for a multi-turn encoder in accordance with the present invention and showing the relationship between the selector tracks of the present invention and a typical prior art selector signal from an encoder with an advance-retard drive circuit including an illustration of the actual outputs from the encoder patterns using both the prior art technique and the pair of selector tracks of the present invention; and FIG. 6 is a diagrammatic illustration of the interconnections of the selector tracks for an encoding arrangement having the complete pattern illustrated in FIG. 5.

Figures 1, 2, 3:
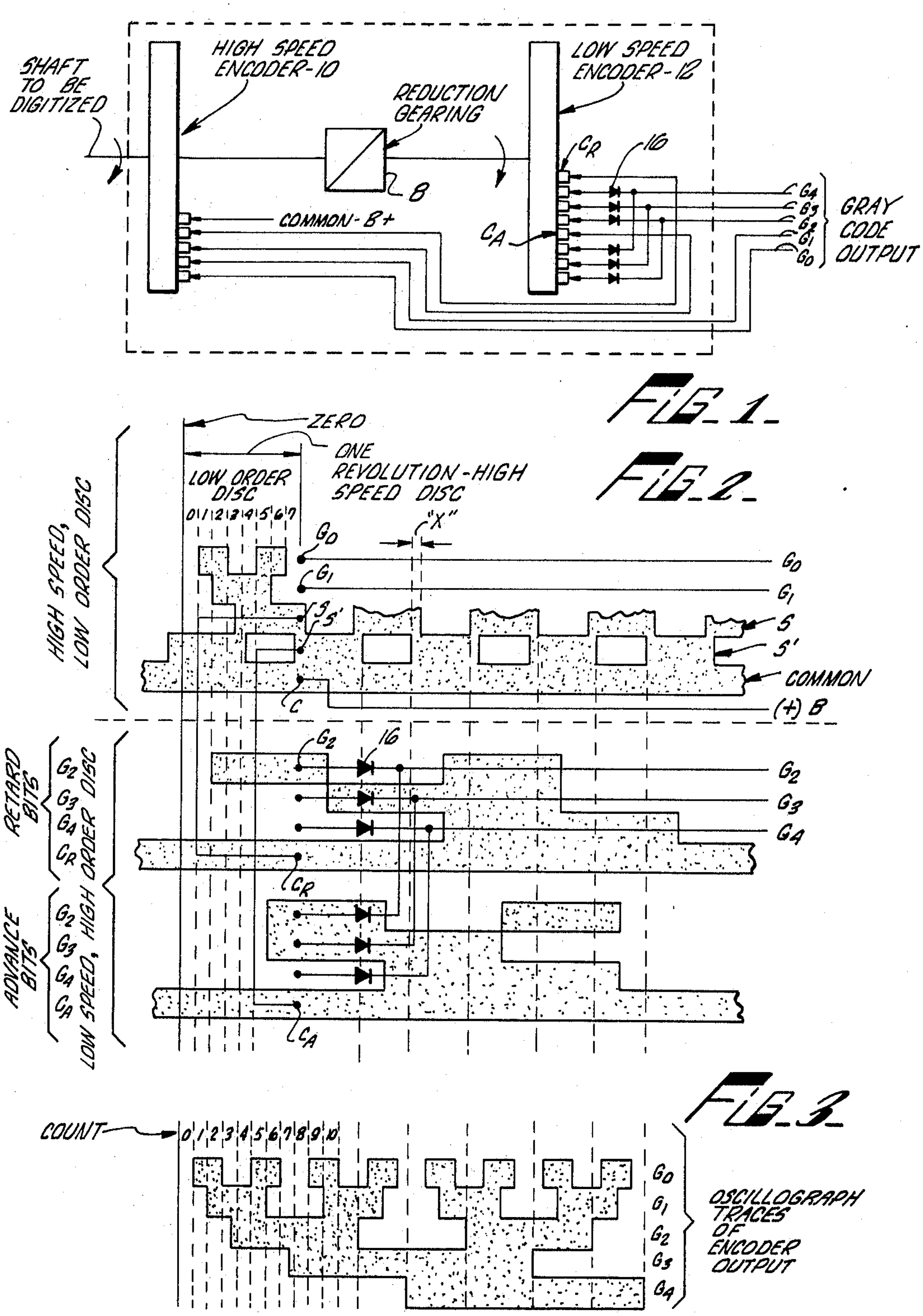
FIG. 1 is a diagrammatic illustration of a multi-turn encoding arrangement embodying the present invention.
FIG. 2 is a developed, fragmentary view of portions of the encoding pattern employed on the elements of the low speed and high speed encoders in accordance with the arrangement of FIG. 1.
FIG. 3 is a representation of an oscillographic trace of the encoder output for the encoding arrangement illustrated in FIGS. 1 and 2.

Now referring to the drawings, the invention will first be described as it may be applied to a multi-turn encoding unit. FIG. 1 diagrammatically illustrates a multi-turn encoding unit that has been simplified for the purposes of illustrating the concept of the present invention. The multi-turn encoding unit illustrated in FIG. 1 is a five bit encoding unit based on the well known Gray code that employs two encoding stages. The encoding unit is shown as a four turn unit with a four to one reduction gearing means 8 arranged between the high speed encoder 10 and the low speed encoder 12.

The shaft to be encoded is diagrammatically illustrated as being coupled to the encoder shaft for the high speed encoder 10 and the encoder shaft is in turn coupled to drive the reduction gearing 8. The low speed encoder 12 is also coupled to the output of the reduction gearing arrangement 8 to be driven thereby at a reduced speed from that of the encoder shaft for the high speed encoder 10 and thereby at a reduced speed from the shaft to be encoded. In this instance, the high speed encoder 10 completes four revolutions for each revolution of the low speed encoder 12.

The high speed encoder 10 is of conventional construction and comprises an encoding element and sensing elements cooperating therewith in the usual fashion. It will be assumed that the encoding elements have the pattern of binary characters recorded thereon in terms of the Gray code as conductive and nonconductive segments. For the purposes of illustrating the invention, the high speed encoding element merely consists of two bits of Gray code, the two least significant bits which are identified as the $G_0$ and $G_1$ bits. The high speed encoding element further includes the usual common track to which is coupled a source of direct current potential (not shown). Coacting with the common or feed track is the pair of selector tracks provided in accordance with the teachings of this invention. The pair of selector tracks are identified as the S and S′ tracks.

The low speed encoder 12 is of the same general construction as the high speed encoder 10. The encoding element for the low speed encoder 12 is provided with a pattern for producing the remaining three bits of the Gray code or the bits identified as the $G_2$, $G_3$ and $G_4$ bits. As in the conventional multi-turn encoding arrangements, the binary characters on the low speed encoding element are duplicated on the low speed element and are arranged in a leading-lagging or advance-retard relationship relative to the binary characters on the high speed encoding element. The advance and retard tracks, or belt of tracks in this instance, are energized from the pair of selector tracks S and S′ on the high speed encoding element. Specifically, a sensing element or brush S of sensing the segments of the selector track S is directly coupled to a sensing element $C_A$ for a common advance track identified as the track $C_A$. The common advance track $C_A$, as will be explained more fully hereinafter, is in electrical engagement with each of the tracks on the low speed encoding element representing the higher order Gray code bits. In the same fashion, the higher order bits arranged in the lagging or retard band on the low speed encoder are energized directly from the sensing element S′ on the high speed encoding element, as illustrated in FIG. 1.

Since the bits $G_2$, $G_3$ and $G_4$ are duplicated on the low speed encoding element, their sensing elements are connected in common to provide an output signal representative of these high order bits. Accordingly, each of the sensing elements in the advance and retard bands for the bits $G_2$, $G_3$ and $G_4$ are coupled in common through an asymetrically conductive device or diode similar to the diodes 16. To correspond with the polarities indicated for the common tracks, the diodes 16 are poled with their anodes connected directly to their respective sensing elements and their cathodes connected in common to form the output circuit for a particular bit. It should now be evident that to derive the five Gray code bits from the two stages illustrated in FIG. 1 that the two least significant bits are derived directly from the high speed encoding element and the three most significant bits are derived from the low speed encoding elements in accordance with whether the advance or retard band is selected by the pair of selector tracks S and S′.

Now referring to FIG. 2, wherein a developed, fragmentary view of the patterns for the multi-turn encoders illustrated in FIG. 1 will be described in more detail. It should be recognized that the Gray code employed for the purposes of describing the present invention is merely illustrative of one of the many unit distance codes with which the present invention may be employed. Accordingly, the recording of the Gray unit distance code in the encoding discs may be by any conventional method and the tracks may be arranged on the encoding element in any convenient fashion. Since it is assumed that the encoding elements are contact type of elements, the patterns shown in a cross hatch fashion in FIG. 2 are representative of conductive areas, while the remaining areas are insulative or nonconductive. It will be assumed, then, that the common or feed track is arranged adjacent the outer edge of the encoding element, shown at the bottom of the low order element in FIG. 2 as a continuous conductive segment and is provided with a sensing element or brush identified as the element C connected to the positive terminal of a source of direct current potential. The application of the source of potential to the common brush C then energizes the conductive segments that are in electrical engagement therewith. In accordance with the teachings of the present invention, the selector tracks S and S′ are recorded on the high speed encoding element adjacent to one another and in electrical engagement with the common track. As illustrated in FIG. 2, the selector track S′ is recorded immediately adjacent and in electrical engagement with the common track, while the selector track S is recorded immediately adjacent and in electrical engagement with the selector track S′.

It is an important feature of the present invention that the conductive and nonconductive segments comprising each of the selector tracks S and S′ are defined in a complementary relationship except for a distance less than one quantum in extent over which both are conducting and during which none of the low order bits are changing (at a time when one of the high order bits is changing). The segments for the selector tracks S and S′ are defined to be slightly overlapping, the amount of overlap is illustrated in FIG. 2 by the indicated distance X. It should be recognized at the outset that the slight overlap between the selector tracks is for the purpose of reducing the tolerances for manufacturing purposes but that the basic construction involved in the concept of the present invention is directed to the provision of a pair of selector tracks and the coacting sensing elements be defined relative to one another so as to activate at least one of the sensing elements or render at least one of the sens-elements conductive at all times so that the encoders may operate without error. Stated differently, the segments or the binary characters for the selector tracks need not be arranged in an overlapping relationship but may be spaced apart a distance depending on the physical width of the sensing element, in this instance the physical width of the brushes riding in the selector tracks, so that at all times at least one of the brushes is rendered conductive, in a make-before break arrangement. When an overlap of the segments in the selector track is desired, the overlap may vary from up to three-fourths of a count in accordance with the error that may be tolerated in the encoding system as will be appreciated more fully hereinafter.

The conductive segments of the selector track S, then, is rendered conductive due to the direct electrical engagement with the conductive segments comprising the selector track S′ at the conductive areas defining the overlap in electrical engagement with the conductive segments for the selector track S. The information tracks or the tracks defining the Gray code bits $G_0$ and $G_1$ are defined adjacent the selector track S. The $G_1$ track is arranged immediately adjacent and in electrical engagement with the conductive segments for the track S and the least significant bit or the $G_0$ track is arranged immediately adjacent and in electrical engagement with the $G_1$ track, as illustrated.

The sensing elements or the brushes for each of the tracks on the low order element are arranged in radial alignment with the common brush C and are identified by the same reference letters as the selector tracks. As illustrated, the brush S′ is arranged in the selector track S′ immediately adjacent a nonconductive area while the brush S is arranged in alignment therewith in the adjacent track S in the area of overlap or X area while the brushes $G_1$ and $G_0$ are both arranged in a nonconductive area. It should also be noted that the segments for the selector tracks S and S′ are arranged, the track S′ in this instance, is defined to be in a conductive condition for approximately the first 180° of a full revolution of the high speed encoder 10, while the selector track S is defined to be in a nonconductive condition during this interval and to be conductive during the latter 180°, with the overlapping conductive area "X" being defined around the 180° point, the point where the tracks change state. In terms of the total number of counts recorded for one revolution of the high speed element, the selector tracks S and S′ can be considered to be on and off for approximately four counts.

The remaining bits, as it is now appreciated, the bits $G_2$, $G_3$ and $G_4$ of the Gray code, are recorded on the low speed element associated with the low speed encoder 12. These binary characters follow the usual Gray code pattern as illustrated in Table I:

TABLE I

| Decimal Code | Gray Code | | | | |
|---|---|---|---|---|---|
| | $G_0$ | $G_1$ | $G_2$ | $G_3$ | $G_4$ |
| 0 | 0 | 0 | 0 | 0 | 0 |
| 1 | 1 | 0 | 0 | 0 | 0 |
| 2 | 1 | 1 | 0 | 0 | 0 |
| 3 | 0 | 1 | 0 | 0 | 0 |
| 4 | 0 | 1 | 1 | 0 | 0 |
| 5 | 1 | 1 | 1 | 0 | 0 |
| 6 | 1 | 0 | 1 | 0 | 0 |
| 7 | 0 | 0 | 1 | 0 | 0 |
| 8 | 0 | 0 | 1 | 1 | 0 |
| 9 | 1 | 0 | 1 | 1 | 0 |
| 10 | 1 | 1 | 1 | 1 | 0 |
| | 0 | 1 | 1 | 1 | 0 |

The bits $G_2$, $G_3$ and $G_4$, then, are duplicated on the low speed encoding element in advance and retard belts. The bits in these high order tracks are arranged in a 180° or four count advance and retard relationship relative to the low order bits $G_0$ and $G_1$. It will be appreciated, then, that with a 180° revolution of the high speed encoder 10, one of the bands is selected by one of the selector tracks, while the other band is selected for the remaining 180° of revolution for the high speed element. The selection afforded by these selector tracks, of course, results due to the energization of the common feed tracks $C_A$ and $C_R$ arranged with the advance and retard tracks or belt of tracks. As illustrated in FIG. 2, the retard bits are recorded immediately below the common track in the low speed disc, with the advance belt being arranged immediately below the retard bits or belt of tracks. The selector brush S is shown directly connected to the common brush $C_R$ or the sensing element for the retard common track, while the selector sensing element S′ is connected directly to the $C_A$ brush for the advance common track.

The line identified as the "Zero" line in FIG. 2 is considered the reference line or the left boundary of the zone defining the count zero, considering the count increases from left to right as illustrated. Accordingly, the common retard track is illustrated as a continuous conductive track with the Gray bits arranged in successive tracks in the order $G_4$, $G_3$ and $G_2$ thereby forming a continuous conductive path with the common track to all of the successive tracks. The conductive and nonconductive segments representative of these high order Gray bits follow the pattern of binary characters shown in Table I. This retard belt of tracks is displaced to the left of its normal position equivalent to two counts. In the same fashion, these same bits are arranged in the advance belt in tracks that are in electrical engagement with the advance common track $C_A$ but are displaced in a leading relationship a distance equivalent to two counts. The total displacement of the advance-retard tracks is equivalent to the four counts or 180° of the selector tracks S and S′. The $G_2$, $G_3$ and $G_4$ Gray bits then are derived from either the advance or the retard belt in accordance with the conduction of the brushes S and S′. The pair of brushes on the low speed element that are required for defining the $G_2$ Gray bit have their brushes connected in common by means of the diodes 16 so that a signal from either the sensing element in the advance or retard belt will be representative of this Gray bit and thereby prevents a signal from being coupled back to the tracks and provide erroneous output signals.

With the above structure and recording pattern in mind, the pattern of a multi-turn encoder to produce the desired Gray code bits $G_0$–$G_4$ will be described in connection with the oscillographic traces representative of the encoder output illustrated in FIG. 3. It has been assumed that the sensing elements in each of the high and low speed elements are arranged in radial alignment. With this in mind, then, and with reference to the decimal code and the equivalent Gray code bits shown in Table I, it will be seen that with the sensing elements arranged adjacent the "Zero" reference line that all of the sensing elements with the exception of the sensing element S′ are situated on a nonconductive segment. The fact that the sensing element S′ has been rendered conductive means that the common track $C_A$ on the low speed element has been rendered conductive and thereby the advance belt of tracks has been selected for this count. However, since none of the sensing elements in the advance belt are in engagement with the corresponding conductive segments, each of the bits $G_2$, $G_3$ and $G_4$ are representative of a binary zero as are the bits $G_0$ and $G_1$ that are directly derived from the high speed element. In comparing the oscillographic trace of FIG. 3 with Table I, it will be seen that in both instances the Gray bits are all in a nonconductive or binary zero position for count zero. Since the pattern of segments has been recorded so that the selector track S′ is conductive for the first four counts of the high speed element, it should now be appreciated that the advance belt of tracks is selected as a result of the corresponding energization of the brush $C_A$ during these four counts. Accordingly, as the sensing elements move from the "Zero" reference line to the right, a comparison of the counts registered on the oscillographic trace can be readily made with the counts of Table I showing that the correct Gray code bits are derived from the encoder.

In stepping through these counts until the encoding units indicate the count three, it will be seen that the overlap between the selector tracks S and S′ will be a factor in determining what the correct count is as the sensing elements travel through the zones defining count three and count four. As the sensing elements enter the left-hand boundary of the zone defining count three, the output corresponding to the Gray bits $G_0$ through $G_4$ will produce a count of 01000 respectively and can be identified in the oscillographic trace of FIG. 3. During this interval, the sensing element S is nonconductive while the sensing element S′ is conductive and thereby has rendered the advance common track conductive. As the sensing elements travel to the right, the count will remain the same until the leading edge of the sensing element S engages the conductive segment in selector track S and thereby renders the connected brush $C_R$ conductive and the conductive segments in the retarded belt of tracks. At this time, then, both the advance and retard tracks have been selected and energized. With this set of conditions prevailing and the brushes still in the zone normally defining count three, the output from the encoder will read 01100 corresponding to the decimal count four rather than the correct decimal count three. It can be determined that this is the indicated count since now the brush $G_2$ arranged in the retard track is in engagement with a conductive segment and is rendered conductive due to the energization of the $C_R$ brush and the corresponding $C_R$ track and thereby defining a circuit to the conductive segments in the $G_2$ track and the corresponding $G_2$ brush. This count continues to be indicated by the encoder during the interval that the sensing elements are in the zone for normally indicating the count four. During the initial portion of this period, however, the sensing element S′ has its lagging edge disengaged from the conductive segment defining the right-hand boundary of the area X and thereby de-energizes the advance common brush $C_A$ and the corresponding belt of tracks. This belt of tracks, then, will remain de-energized for the remaining four counts or the remaining 180° of revolution of the high speed encoder 10 and the count will be derived from the low speed element due to the energization of the retard belt of tracks. By comparing Table I for the decimal count five with the oscillograph trace of FIG. 3, it will be seen that this count is correctly indicated by the encoding units since it now indicates the counts of the Gray bits 11100 for the respective bits $G_0$ through $G_4$ and the selector tracks S and S′ are respectively in the one and zero conditions. The correct count will be indicated from the advance belt of tracks until the high speed encoder completes its revolution and the selector tracks change state again between counts eight and nine.

It should now be appreciated that when the conductive segments for the selector tracks S and S′ are arranged in a slightly overlapping relationship that the correct count is not always indicated from the encoder but that during the intervals the selector tracks overlap, the sensing elements are in a zone for normally indicating count N but will be indicating the count $N+1$ due to the overlap. From a practical standpoint, this means that the encoder will be indicating the succeeding count or shaft position a slight interval before the shaft actually reaches that position. Since the overlap of the selector track segments is defined to be only a very small part of a count, the angular error generated by such an arrangement is well within the accuracy obtained in present day state of the art contact type of encoders. When the encoding element is defined as an encoding disc, the fixed linear error introduced by overlapping the selector tracks can be minimized by locating the selector tracks as the first two tracks adjacent the outer periphery of the encoding element thereby reducing the angular error produced in the low speed encoding element. The amount of overlap will vary from zero to three-fourths of a count depending on the cost and application of the encoder. The cost is, of course, increased when no overlap is provided and decreased with increasing overlaps.

The important aspect of the concept of this invention, then, is the definition of a pair of selector tarcks for an encoder employing a unit distance code wherein the pair of selector tracks are complementary except for a distance or angle less than one quantum in extent over which both selector tracks are conducting, and thereby both advance and retard tracks are conducting, and during which none of the low order bits are changing. From a practical standpoint, the encoder of the present invention does not generate any improper codes while the overlap of the selector tracks merely displaces the transition point slightly.

Figure 4:
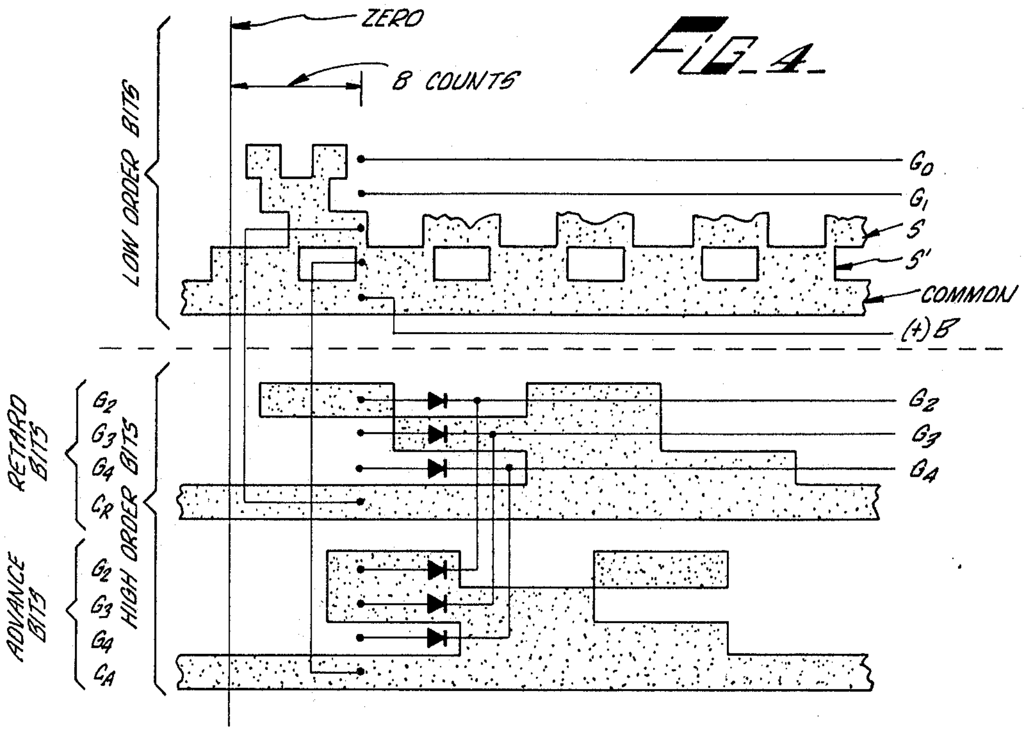
FIG. 4 is a developed, fragmentary view of the encoding pattern shown in FIGS. 1 through 3 represented for a single turn encoding unit and embodying the present invention.

Now referring to FIG. 4, the concept of the dual selector tracks will be described as it may be applied to a single turn encoder for increasing the resolution that may be obtained when the normal arrangements are used. In a single turn encoder the present invention is advantageous in that it allows the higher order bits to be selected with a higher degree of resolution than present day techniques. The pattern for a five bit single turn encoder illustrated in FIG. 1 is essentially the same as that illustrated in FIG. 2 for the multi-turn encoder. To this end, the pair of selector tracks S and S′ and the information tracks for the Gray bits $G_0$ and $G_1$ are identical. The advance and retard bits corresponding to the Gray bits $G_2$, and $G_3$ and $G_4$ can be seen to be arranged on the same element as the bits $G_0$ and $G_1$, but arranged with an advance and retard common as in the multi-turn encoder and correspondingly arranged in an advance-retard relationship with regard to the low order bits $G_0$ and $G_1$. Without further expanation then, the counts derived from the single turn encoder based on the pattern shown in FIG. 4 can be compared with the Gray code counts of Table I and the oscillograph of FIG. 3 to readily derive the correct output for each count position.

Now referring to FIG. 5 wherein the invention is illustrated as applied to another unit distance code identified as the MOA-GILLHAM code which is presently being used for altitude encoding and reporting. The MOA-GILLAM code is essentially the combination of the Gray code discussed thereinabove and the well known Datex code; the Datex code is disclosed in U.S. Patent 3,165,731. The arrangement is such that the Datex code defines the bits for the units count of the encoder and the Gray code defines the bits for each of the higher order decades, the tens, hundreds, etc.

The illustration of FIG. 5 includes the diagrammatic representation of the pair of selector tracks S and S′ along with the diagrammatic representation of the corresponding on and off pattern that is obtained from the normal selector signal from a conventional encoder having the advance-retard drive circuits. The arrangement illustrated is for a multi-turn encoder wherein the low speed element is merely illustrated with the pair of selector tracks S and S′ and the high speed element is shown with three bits in the advance and retard tracks identified as the $A_1$, $A_2$, and $A_4$ bits in accordance with the identification of the MOA-GILLHAM code. To simplify the illustration, the sensing elements and the common tracks for each of the encoding elements are eliminated and to show the relationship between the actual output of the encoder with the use of the selector signals of the present invention and the selector signal from a conventional or prior art encoder, an illustration of the output from the encoder under both conditions is represented immediately below the retard belt of tracks in FIG. 5.

In comparing the outputs of the prior art encoder with the encoder of the present invention, the small amount of displacement of the normal transition points introduced by the overlapping of the selector tracks can be readily appreciated. The superimposed outputs from the two encoders not only illustrates the extent of the displacement but also the negligible error introduced in the encoder output without the generation of any improper codes.

What is claimed is:

1. An encoding element for an encoder provided with encoding tracks having a unit distance code recorded thereon, said encoding tracks having at least some of the tracks having a pattern of unit distance binary characters arranged in an advance-retard relationship with at least one of the other tracks, the improvement comprising said encoding element having a pair of complementary segments, except for an extent substantially less than a unit distance over which both are active recorded thereon for allowing selection of either the advanced or retarded binary characters when activated.

2. A coding element for an encoder including an encoding disc having a unit distance code recorded thereon in terms of conductive and nonconductive segments in a preselected pattern of tracks, each track representing a character of different binary significance in the unit distance code, said pattern of tracks including at least a single track of the code recording in duplicate high order bits on the disc and arranged thereon in a lead-lag relationship with at least one of the other tracks, and a pair of complementary selector tracks recorded on the disc except for an angle less than a quantum in extent over which both selector tracks may be conductive for selecting the lead or lag track.

3. A coding element for an encoder including an encoding element having a unit distance code recorded thereon in a preselected pattern of tracks, each track representing a character of different binary significance in the unit distance code, said pattern of tracks including at least a single track of the code recorded in duplicate on the encoding element in an advance-retard relationship with at least one of the other tracks on the element, and a pair of essentially complementary selector tracks recorded on the element and defined to overlap a preselected amount.

4. A coding element for an encoder as defined in claim 3 wherein the encoding element is a disc and the selector tracks are recorded as the first and second tracks adjacent the outer periphery thereof.

5. An encoder comprising an element having a preselected pattern of binary characters comprising conductive and nonconductive segments representative of a unit distance code recorded in tracks thereon, each track representing a character of different binary significance in the unit distance code, said pattern of tracks including at least a single track of the code recorded in duplicate on the element and arranged thereon in a lead-lag relationship which at least one of the other tracks, a pair of selector tracks recorded on the element with each having binary characters comprising conductive and nonconductive segments with the binary characters of each selector track being arranged in a complementary fashion relative to one another except for an extent over which both are conducting, means for energizing the selector tracks, means for sensing the binary characters of the selector tracks, the conductive segments of the selector tracks and the sensing elements therefore being defined relative to one another to always render at least one of the sensing elements for the selector tracks conductive in a make before break sequence, individual means connected to one of the sensing elements for each of the selector tracks for rendering leading and lagging tracks of said duplicated track conductive in response to the conduction of the connected sensing element, means for sensing preselected binary characters in each track, and means for producing relative movement between said element and said sensing means.

6. An encoder comprising an encoding disc having a preselected pattern of binary characters representative of a unit distance code recorded in tracks thereon, each track representing a character of different binary significance in the unit distance code, said pattern of tracks including at least a single track of the code recorded in duplicate on the element for representing a high order binary character and arranged thereon in a lead-lag relationship with at least one of the other low order tracks of binary characters, a pair of selector tracks recorded on the disc adjacent the outer periphery thereof with each having binary characters arranged in a complementary fashion relative to one another except for an angle less than a unit distance over which both are actuated and during which none of the low order binary characters are changing, means for energizing the selector tracks, means arranged with the disc for sensing the binary characters in each track, the binary characters of the selector tracks and the sensing elements therefor being defined relative to one another to always actuate at least one of the sensing elements for the selector tracks, individual means connected to one of the sensing elements for each of the selector tracks for actuating the leading and lagging track of said duplicated track for sensing the corresponding binary character in response to the actuation of the connected sensing element, and means for producing relative movement between said disc and said sensing means.

7. An encoder comprising an element having a preselected pattern of binary characters comprising conductive and nonconductive segments representative of a unit distance code recorded in tracks thereon, each track representing a character of different binary significance in the unit distance code, said pattern of tracks including at least a single track of the code recorded in duplicate on the element and arranged thereon in a lead-lag relationship with at least one of the other tracks, a pair of selector segments recorded on the element comprising conductive and nonconductive segments arranged in a complementary fashion relative to one another except for a preselected overlap whenever the segments are to change state, individual means for energizing the selector segments, means for sensing the binary characters in each track for sensing a character of the same binary significance, individual means connected to one of the sensing elements for each of the selector segments for rendering either the leading and lagging track of said duplicated track conductive in response to the conduction of the connected sensing element, and means for producing relative movement between said element and said sensing means.

8. In a multi-turn encoder comprising first and second encoding units adapted to be driven by a shaft to be encoded, reduction gearing means connected to said first encoding unit for driving said second encoding unit at a predetermined lower speed than the first encoding unit, said first encoding unit comprising an encoding element including a pair of selector tracks recorded thereon and defined to be complementary except for an extent less than a unit distance over which both tracks are actuated, sensing means for each track, means for producing relative movement between said encoding element and the sensing means in accordance with the positions of a shaft to be encoded, said second encoding unit including an encoding element having a unit distance code recorded thereon in a preselected pattern of tracks, each track representing a character of different binary significance being recorded on said encoding element in duplicate and arranged thereon in a lead-lag relationship relative to the tracks on the first encoding unit, sensing means for each track of the encoding element of the second encoding unit, means connected to the sensing element for one of the selector tracks of the first encoding unit for actuating the leading track on the encoding element for the second encoding unit, means connected to the sensing element for the other selector track of the first encoding unit for actuating the lagging track on the encoding element for the second encoding unit, and means coupled to said speed reduction means for producing relative movement between the sensing means and the encoding element of the second encoding unit.

9. In a multi-turn encoder comprising a fine encoding unit including an element having a preselected pattern of binary characters representative of a unit distance code recorded in tracks thereon representative of low order characters, each track representing a character of different binary significance in the unit distance code, a pair of selector tracks each having binary characters arranged in a complementary relationship except for a distance less than a unit distance over which both are activated and during which none of the low order characters are changing, means for activating the selector tracks, means for sensing the binary characters in each track, the binary characters of the selector tracks and the sensing elements therefor being defined relative to one another to always activate at least one of the sensing elements for the selector tracks, means coupled to a shaft to be digitized for producing relative movement between said element and said sensing means in accordance with the positions of the shaft to be digitized, a second encoding unit having an element with a preselected pattern of binary characters representative of a unit distance code recorded in tracks thereon representative of high order characters, each character of different binary significance being recorded in two separate tracks on the element and displaced in an advance-retard relationship to be alternately and sequentially activated in accordance with said complementary pattern of the selector tracks in response to the alternate and sequential activation of the sensing means for the selector tracks, means for sensing the binary characters in each of the tracks recorded on the element for said second encoding unit, means coupled between the sensing means for one of the selector tracks and an advance track of characters of the second encoding unit for activating the advance track, and means coupled between the sensing means for the other selector track and a retard track of characters for activating the retard track.

10. In a multi-turn encoder as defined in claim 9 wherein the elements are discs and all of the binary characters represented on the discs of the first and second encoders comprise conductive and nonconductive segments and the selector tracks are arranged adjacent the outer periphery of said disc.

11. In a multi-turn encoder as defined in claim 10 wherein the selector tracks are defined to be slightly overlapping and the sensing elements are brushes defined relative to the segments to make before braking at the points the tracks change state.

12. In an encoder provided with an encoding element having at least a single track recorded thereon in a lead-lag relationship with at least one of the other tracks and including an encoding element having unit distance binary characters recorded thereon in a preselected pattern of tracks and a pair of selector segments recorded on the element in a complementay relationship except for an extent less than a unit distance over which both segments are active, means for sensing the binary characters and the selector segments to provide an output indication corresponding thereto, the selector segments and the sensing means therefor providing output indications that are complementary except that they overlap for the time corresponding to the extent both segments are active.

13. In an encoder provided with an encoding element having a pattern including at least a single track recorded in a lead-lag relationship with at least one of the other tracks of the encoder, said encoder including an encoding element having a pattern of unit distance binary characters recorded in a preselected pattern of tracks thereon, means for sensing the binary characters recorded in the tracks and providing an output indication thereof upon production of relative movement between the sensing means and the element, means for producing relative movement between said element and said sensing means, said element further including a pair of selector segments recorded thereon in a preselected complementary relationship and said sensing means including sensing means arranged with the selector segments whereby the output indications from the selector segment sensing means are complementary except for a time interval substantially less than a unit distance over which both output indications overlap.

14. In an encoder provided with an encoding element having a pattern including at least a single track recorded in a lead-lag relationship with at least one of the other tracks of the encoder, said encoder including an encoding element having unit distance binary characters recorded thereon in a preselected pattern of tracks and a pair of selector segments recorded thereon in a preselected complementary relationship, means for sensing the binary characters in each track and the selector segments to provide output indications corresponding thereto, said encoder being further characterized in that the selector segments and the sensing means therefor are defined relative to one another for providing output indications that are complementary except for an overlapping time interval corresponding to an extent substantially less than a unit distance recorded on the element.

15. An encoder comprising an encoding element having a preselected pattern of binary characters representative of a unit distance code recorded in tracks thereon, each track representing a character of different binary significance in the unit distance code, said pattern of tracks including at least a single track of the code recorded in duplicate on the element and arranged thereon in a lead-lag relationship with at least one of the other tracks of binary characters, a pair of selector segments recorded on the element in a preselected complementary fashion relative to one another, means for energizing the selector segments, means for sensing the binary characters in each track and for sensing the selector segments, the binary characters of the selector segments and the sensing elements therefor being defined relative to one another to always actuate at least one of the sensing elements for the selector segments whereby said sensing elements provide complementary output indications except for a time interval less than that corresponding to a unit distance and during which time interval both said sensing elements are actuated, individual means connected to one of the sensing elements for each of the selector segments for actuating the leading and lagging track of said duplicated track for sensing the corresponding binary character in response to the actuation of the connected sensing element, and means for producing relative movement between said element and said sensing means.

16. An encoder comprising an element having a preselected pattern of binary characters comprising conductive and nonconductive segments representative of a unit distance code recorded in tracks thereon, each track representing a character of different binary significance in the unit distance code, said pattern of tracks including at least a single track of the code recorded in duplicate on the element and arranged thereon in a lead-lag relationship with at least one of the other tracks, a pair of conductive and nonconductive selector segments recorded on the element and being arranged in a preselected complementary fashion relative to one another except for an extent over which both are conducting, means for energizing the selector segments, individual means for sensing the binary selector segments, the conductive selector segments and the sensing elements therefor being defined relative to one another to always render at least one of the sensing elements for the selector segments conductive in a make before break sequence in accordance with the preselected complementary fashion to include an extent less than a unit distance over which both are conducting, individual means connected to one of the sensing elements for each of the selector segments for rendering leading and lagging tracks of said duplicated track conductive in response to the conduction of the connected sensing element, means for sensing preselected binary characters in each track, and means for producing relative movement between said element and said sensing means.

17. In a multi-turn encoder comprising a first encoding unit including an element having a preselected pattern of binary characters representative of a unit distance code recorded in tracks thereon representative of low order characters, each track representing a character of different binary significance in the unit distance code, a pair of binary selector characters arranged in a preselected complementary relationship, means for sensing the binary characters in each track, means for sensing each of the binary selector characters, the binary selector characters and the sensing elements therefor being defined relative to one another to always activate at least one of the sensing elements for the selector characters in accordance with the preselected complementary relationship except for a distance less than a unit distance over which both are activated and during which none of the low order characters are changing, means coupled to a shaft to be digitized for producing relative movement between said element and said sensing means in accordance with the positions of the shaft to be digitized, a second encoding unit having an element with a preselected pattern of binary characters representative of a unit distance code recorded in tracks thereon representative of high order characters, each character of different binary significance being recorded in two separate tracks on the element and displaced in an advance-retard relationship to be alternately and sequentially activated in accordance with said complementary pattern of the selector segments in response to the alternate and sequential activation of the sensing means for the selector segments, means for sensing the binary characters in each of the tracks recorded on the element for said second encoding unit, means coupled between the sensing means for one of the selector segments and an advance track of characters of the second encoding unit for activating the advance track, and means coupled between the sensing means for the other selector segment and a retard track of characters for activating the retard track.

References Cited

UNITED STATES PATENTS

| | | | |
|---|---|---|---|
| 3,054,996 | 9/1962 | Spaulding et al. | 340—347 |
| 3,286,251 | 11/1966 | Byun et al. | 340—347 |

MAYNARD R. WILBUR, Primary Examiner

M. K. WOLENSKY, Assistant Examiner

PO-1050
(5/69)

UNITED STATES PATENT OFFICE
CERTIFICATE OF CORRECTION

Patent No. 3,487,460 Dated December 30, 1969

Inventor(s) Edwin L. Wheeler

It is certified that error appears in the above-identified patent and that said Letters Patent are hereby corrected as shown below:

Column 4, line 45, change "of" to --for--;

Column 5, line 49, change "sens" to --sensing--;

Column 8, line 53, change "tarcks" to --tracks--;

Column 10, line 24, change "which" to --with--

Column 11, line 48, change "fine" to --first--

SIGNED AND SEALED
JUN 23 1970

(SEAL)
Attest:

Edward M. Fletcher, Jr.
Attesting Officer

WILLIAM E. SCHUYLER, JR.
Commissioner of Patents